(12) United States Patent
Takezawa et al.

(10) Patent No.: US 9,009,771 B2
(45) Date of Patent: Apr. 14, 2015

(54) VIDEO DISTRIBUTION SYSTEM REDUCING VIDEO DATA TRAFFIC AND A METHOD THEREFOR

(71) Applicant: Oki Electric Industry Co., Ltd., Tokyo (JP)

(72) Inventors: Masayuki Takezawa, Tokyo (JP); Yoshihiro Ueda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 71 days.

(21) Appl. No.: 13/927,191

(22) Filed: Jun. 26, 2013

(65) Prior Publication Data

US 2014/0026173 A1    Jan. 23, 2014

(30) Foreign Application Priority Data

Jul. 19, 2012   (JP) ................................. 2012-160911

(51) Int. Cl.
*H04N 7/173* (2011.01)
*H04N 21/2183* (2011.01)
*H04N 21/60* (2011.01)
*H04N 21/231* (2011.01)
*H04N 21/845* (2011.01)

(52) U.S. Cl.
CPC ........... *H04N 21/2183* (2013.01); *H04N 21/60* (2013.01); *H04N 21/23106* (2013.01); *H04N 21/8456* (2013.01)

(58) Field of Classification Search
CPC ........................... H04N 21/60; H04N 21/2183
USPC .................. 725/109, 115, 116, 118
See application file for complete search history.

(56) References Cited

U.S. PATENT DOCUMENTS

| | | | | |
|---|---|---|---|---|
| 8,032,409 | B1* | 10/2011 | Mikurak | 705/14.39 |
| 2002/0026639 | A1* | 2/2002 | Haneda | 725/87 |
| 2007/0101164 | A1* | 5/2007 | Ando et al. | 713/193 |
| 2010/0134837 | A1* | 6/2010 | House | 358/1.15 |
| 2012/0278833 | A1* | 11/2012 | Tam | 725/31 |
| 2013/0036124 | A1* | 2/2013 | Ambwani et al. | 707/749 |

OTHER PUBLICATIONS

Shogo Ando et al., "A Study of In-Network Cache for Redundancy Elimination at Network Edges", The Institute of Electronics, Information and Communication Engineers (IEICE), Technical Report of IEICE, pp. 1-8, Jul. 22, 2011.

* cited by examiner

*Primary Examiner* — Pankaj Kumar
*Assistant Examiner* — Sahar Baig
(74) *Attorney, Agent, or Firm* — Rabin & Berdo, P.C.

(57) ABSTRACT

In a video distribution apparatus, a memory caches segments of video data into which video data received from a communication network is sectioned on a basis of a predetermined unit and stores video identifying information of the segments of video data. A distribution controller derives, upon receipt of a cache distribution request from the network, video identifying information contained in a cache distribution request. A relay controller obtains segments of video data associated with the video identifying information from the memory to transfer the obtained segments of video data to a requester at a transfer rate defined on the segments of video data in the vicinity of a source of the video data. The video can be distributed at a transfer rate close to a transfer rate defined by a content distribution server while the video traffic can be diminished.

9 Claims, 11 Drawing Sheets

FIG. 4

| CONTENT HASH VALUE | RECEPTION START TIME | RECEPTION END TIME | DATA SIZE |
|---|---|---|---|
| 000000001 | 10:00:00:00 | 10:00:10:00 | 10,485,760 |
| 000000002 | 10:00:10:00 | 10:00:20:00 | 10,485,760 |
| 000000003 | 10:00:20:00 | 10:00:30:00 | 10,485,760 |
| ... | ... | | |
| 000000180 | 10:29:50:00 | 10:30:00:00 | 10,485,760 |

| CONTENT HASH VALUE 710 | RECEPTION START TIME 720 | RECEPTION END TIME 730 | DATA SIZE 740 | VIDEO DATA 750 |
|---|---|---|---|---|
| 000000001 | 10:00:00:00 | 10:00:10:00 | 10,485,760 | D1 |
| 000000002 | 10:00:10:00 | 10:00:20:00 | 10,485,760 | D2 |
| 000000003 | 10:00:20:00 | 10:00:30:00 | 10,485,760 | D3 |
| ... | ... | ... | ... | ... |
| 000000180 | 10:29:50:00 | 10:30:00:00 | 10,485,760 | D180 |

28

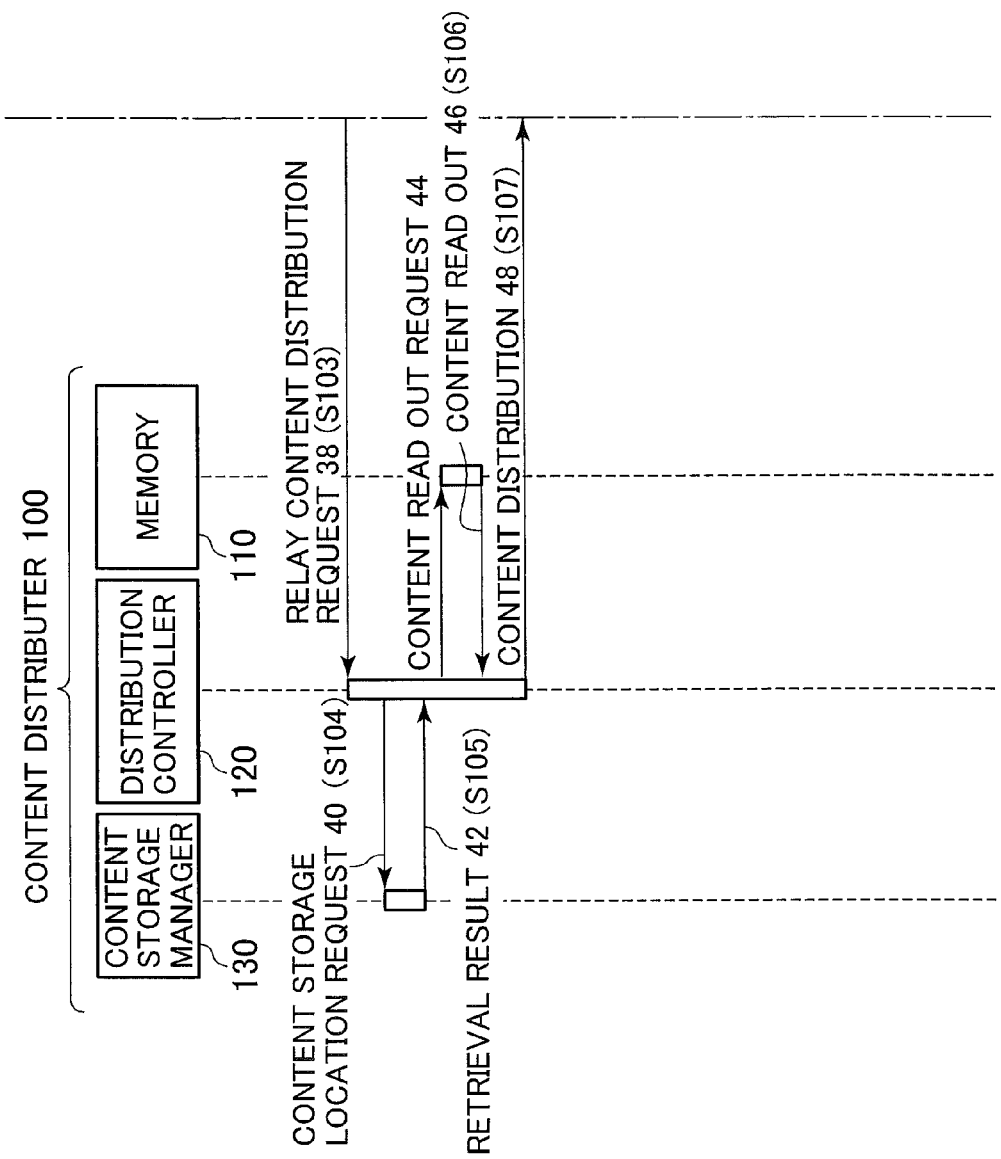

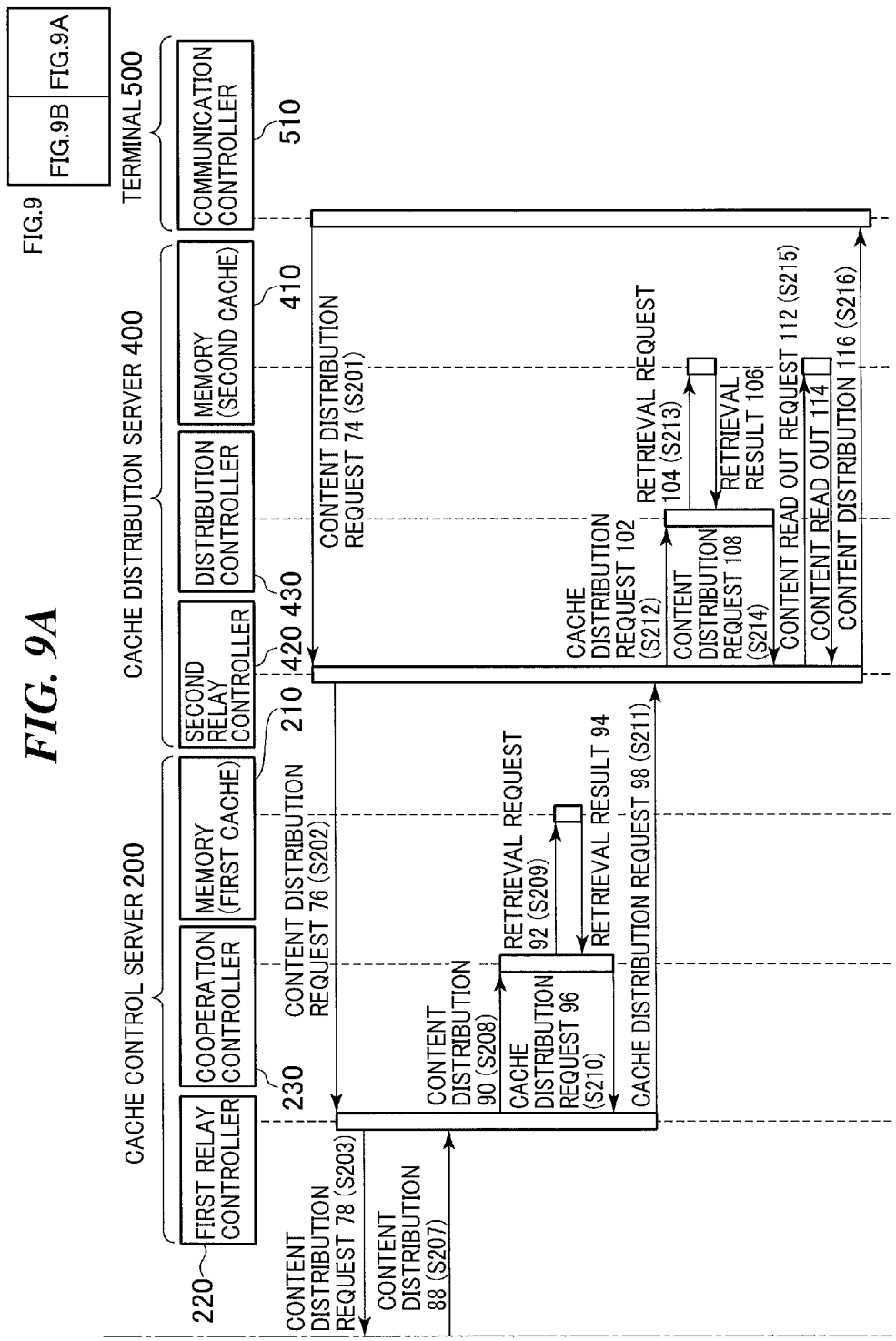

VIDEO DISTRIBUTION SYSTEM REDUCING VIDEO DATA TRAFFIC AND A METHOD THEREFOR

BACKGROUND OF THE INVENTION

1. Field of the Invention

The present invention relates to a video distribution system reducing video data traffic and a video distribution method therefor, which are applicable to such as a cache control server and a video distribution server for executing video distribution over a communication network.

2. Description of the Background Art

Use of video distribution services for distributing video data over a communication network has been expanded in recent years. Video traffic of video distribution is claimed to make up a large share of network traffic. In addition, the video traffic is known for conveying a lot of redundant video data.

Diminishment of such redundant video data traffic reduces a load on the video traffic, leading to increase in efficiency of the traffic over the network.

A non-patent document, Shogo ANDO, et al., "A Study of In-Network Cache for Redundancy Elimination at Network Edges", The Institute of Electronics, Information and Communication Engineers (IEICE), Technical Report of IEICE, 2011, presents a known art for diminishing the traffic of redundant video data, which is called as In-Network cache technique, in which a given pair of routers having a cache function caches packets flowing between the routers, so that one of the routers does not transfer between the routers cached packets and redundant packets so as to permit the destination router to send packets out from a cache. It can reduce redundant packets between routers and consequently diminish video traffic.

However, the properties of the video distribution cause a tendency in the data volume of a single content to be larger than that of average data, and thus further diminishment is needed to the video traffic because use of video distribution services will be expanded more and more in the future.

In addition, when the user watches or listens to contents, it is preferable to allow the user to watch or listen at a transfer rate defined by a content distribution server. However, the diminishment of the video traffic conducted simply by applying the technique taught in the aforementioned Shogo ANDO, et al., cannot implement stable video data transfer, and thereby delays may be caused during watching the video. Hence, it is necessary to transfer video data such that the transfer rate will be smoothed and to distribute contents at a transfer rate close to that defined by the content distribution server.

SUMMARY OF THE INVENTION

It is an object of the present invention to provide a video distribution system and a video distribution method therefor which are free from those problems.

A video distribution apparatus of the present invention a memory caching a segment of video data into which video data received from a communication network is sectioned on a basis of a predetermined unit, and storing at least video identifying information identifying the segment of video data; a distribution controller operative in response to a cache distribution request received from the network for deriving the video identifying information contained in the cache distribution request, and controlling relay distribution on the basis of the obtained video identifying information; and a relay controller receiving the cache distribution request to supply the received cache distribution request to the distribution controller, and obtaining the segment of video data associated with the video identifying information from the memory to transfer the obtained segment of video data to a requester at a transfer rate defined on the segment of video data in a vicinity of a source of the video data.

In accordance with the present invention, a video distribution method in the video distribution apparatus set forth above comprises: receiving the cache distribution request by the relay controller, and supplying the received cache distribution request to the distribution controller; obtaining by the distribution controller the video identifying information contained in the cache distribution request and controlling relay distribution on the basis of the obtained video identifying information; reading out by the distribution controller from the memory the cached segment of video data associated with the obtained video identifying information; and transferring by the relay controller the read-out segment of video data to a requester at a transfer rate defined on the segment of video data in the vicinity of a source of the video data.

Also in accordance with the present invention, a cache controlling apparatus receiving video data near a source of the video data comprises: a cooperation controller dividing the received video data into at least one segment of video data on a basis of a predetermined unit, and obtaining video identifying information identifying the segment of video data; a memory storing the video identifying information of the segment of video data in association with reception time and a size of the segment of video data, the cooperation controller determining whether or not the memory contains the video identifying information matching the obtained video identifying information, and outputting a control signal representative of a result of determination; and a relay controller operative in response to the control signal for transmitting, when the memory contains the video identifying information matching the obtained video identifying information, a cache distribution request containing at least the video identifying information.

Further in accordance with the present invention, a cache control method in the cache controlling apparatus comprises: receiving by the relay controller the video data, and supplying the received video data to the cooperation controller; deriving by the calculator the video identifying information of the segment of video data; determining by the operation controller whether or not the memory contains the video identifying information matching the obtained video identifying information, and outputting the control signal representative of a result of determination; storing by the relay controller in the memory, when the cooperation controller determines that the memory does not contain the video identifying information matching the obtained video identifying, the video identifying information of the segment of video data in association with reception time and a size of the segment; and transmitting by the relay controller, when the memory contains the video identifying information matching the obtained video identifying information, the cache distribution request containing at least the video identifying information.

Yet further in accordance with the present invention, a video distribution system is also provided which comprises the video distribution apparatus and the cache controlling apparatus set forth above connected to each other by a communication network. Further, a video distribution method in the video distribution system is also provided.

In accordance with the present invention, video traffic can be diminished while stably distributing video data at a transfer rate close to a transfer rate defined by a content distribution server.

BRIEF DESCRIPTION OF THE DRAWINGS

The objects and features of the present invention will become more apparent from consideration of the following detailed description taken in conjunction with the accompanying drawings in which:

FIG. 4 exemplarily shows content information of video data sectioned on a temporal basis to be stored in a memory in the preferred embodiment;

FIG. 6 exemplarily shows, like FIG. 4, content information of another video data sectioned on the temporal basis to be stored in the memory in the preferred embodiment;

FIGS. 8A and 8B are a sequential chart showing, when combined as shown in FIG. 8, a sequence of video distribution processing for requesting distribution of a video content according to the preferred embodiment; and FIGS. 9A and 9B are also a sequential chart showing, when combined as shown in FIG. 9, a sequence of video distribution processing to be conducted when a distribution of the same video content is requested again in the preferred embodiment.

DESCRIPTION OF THE PREFERRED EMBODIMENTS

Some preferred embodiments of a video distribution system in accordance with the present invention will be described in detail with reference to the accompanying drawings.

Figure 1:
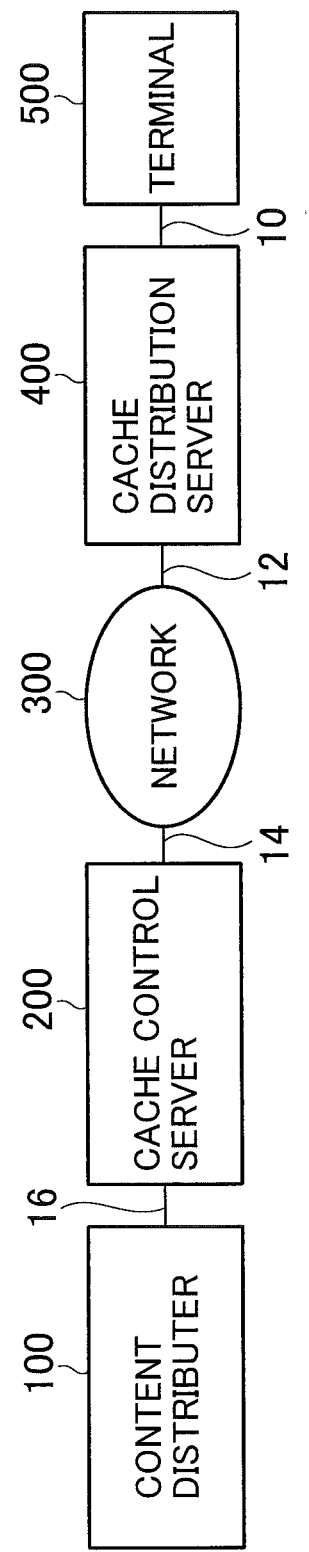
FIG. 1 is a schematic block diagram showing the entire configuration of a video distribution system in a preferred embodiment of the present invention.

First with reference to FIG. 1 showing, in a schematic block diagram, the entire configuration of a video distribution system 1 in accordance with an illustrative embodiment, the video distribution system 1 comprises a content distributer 100, a cache control server 200, a communication network 300, a cache distribution server 400 and a terminal device 500, all of which are interconnected as illustrated.

The terminal device 500 is adapted to request the content distributer 100 to distribute video data and reproduce video data 10 received. The terminal device 500 is connected to the cache distribution serve 400 to send a video distribution request packet 10 addressed to the content distributer 100 toward the cache distribution server 400.

The terminal device 500 receives video data 10 from the cache distribution server 400 to reproduce, or visualize, the received data 10. The terminal device 500 may be implemented by information processing devices having communication function such as television sets, personal computers, mobile terminals, e.g. so-called smartphones, PDAs (Personal Digital Assistants) and e-book readers, mobile-phone sets, game consoles and similar.

The cache distribution server 400 has a cache function for caching the video data 12 received on the network 300, and is adapted to distribute the cached video data if the same video data is needed to be distributed again.

The cache distribution server 400 may be placed near the terminal device 500 so as to distribute the video data at a distribution rate close or substantially equal to a distribution rate defined by the content distributer 100. For example, the cache distributer 400 is preferably arranged at locations of networking equipment, e.g. a gateway, router and equivalent, of a communication network to which the terminal device 500 belongs, or arranged where a radio base station or switching equipment locates if the terminal device 500 is adapted to receive video data through a wireless communication.

The cache distribution server 400 receives a video distribution request 10 addressed to the content distributer 100 through the terminal device 500, and in turn relays the received request 10 to the network 300.

The cache distribution server 400 also receives video data 12 from the cache control server 200 over the network 300, and then caches the received video data 12 and simultaneously supplies the received data 12 as the received data 10 to the terminal device 500. As well as the received video data, the cache distribution server 400 caches content information including video identifying information which allows the cache control server 200 to identify video data.

The video identifying information is information identifying particular one of segments, or sections, of video data into which video data of a content to be distributed is sectioned on the basis of a predetermined temporal unit, e.g. a predetermined length of time. In the illustrative embodiment, the video identifying information may be, for instance, hash values which uniquely identify respective sections of the video data.

The cache distribution server 400 further receives from the cache control server 200 a packet 12 that includes a video distribution request, and in response to the video distribution request, sends the cached video data 10 to the terminal device 500. In this regard, the cache distribution server 400 obtains a video distribution request that contains video identifying information. The cache distribution server 400 uses the obtained video identifying information to distribute video data 10 which corresponds to the video identifying information.

The video data cached by the cache distribution server 400 is thus requested for distribution by means of a video distribution request containing video identifying information, so that the network 300 will not convey packets containing a large amount of video data, thereby generally diminishing video data traffic on the network.

The communication network 300 is configured to which connected are the cache distribution server 400 and the cache control server 200 by communication lines 12 and 14, respectively. The communication network 300 may be a telecommunications network, such as an IP (Internet Protocol) network, by way of example.

The cache control server 200 receives video data 16 from the content distributer 100 and in turn figures out video identifying information that uniquely identifies respective parts or segments of the video data which are sectioned on the temporal basis.

In turn, the cache control server 200 controls video distribution on the content distribution server 400 such that, when the video data thus received is not cached by the content distribution server 400, the cache control server 200 sends a video data packet including the received video data and content information, described later, and, when the video data thus received is cached by the content distribution server 400, the server 400 sends a video distribution request including cached content information carrying information for identifying the video, i.e. video identifying information.

As described above, the video identifying information can be the hash values of video data. Therefore, the cache control server 200 calculates the hash values of sections of video data that are segmented on the temporal basis and caches, or stores, the obtained hash values of the video data thus obtained.

The cache control server 200 is connected to the network 300 and the content distributer 100, so that when the cache control server 200 receives a video distribution request packet 14 addressed to the content distributer 100 over the network 300, it relays or transfers the received packet 14 to the content distributer 100.

The content distributer 100 is adapted to receive from the cache control server 200 the video distribution request packet 16 sent from the terminal device 500 and delivers video data, or contents, thus requested to the cache control server 200.

Figure 2:
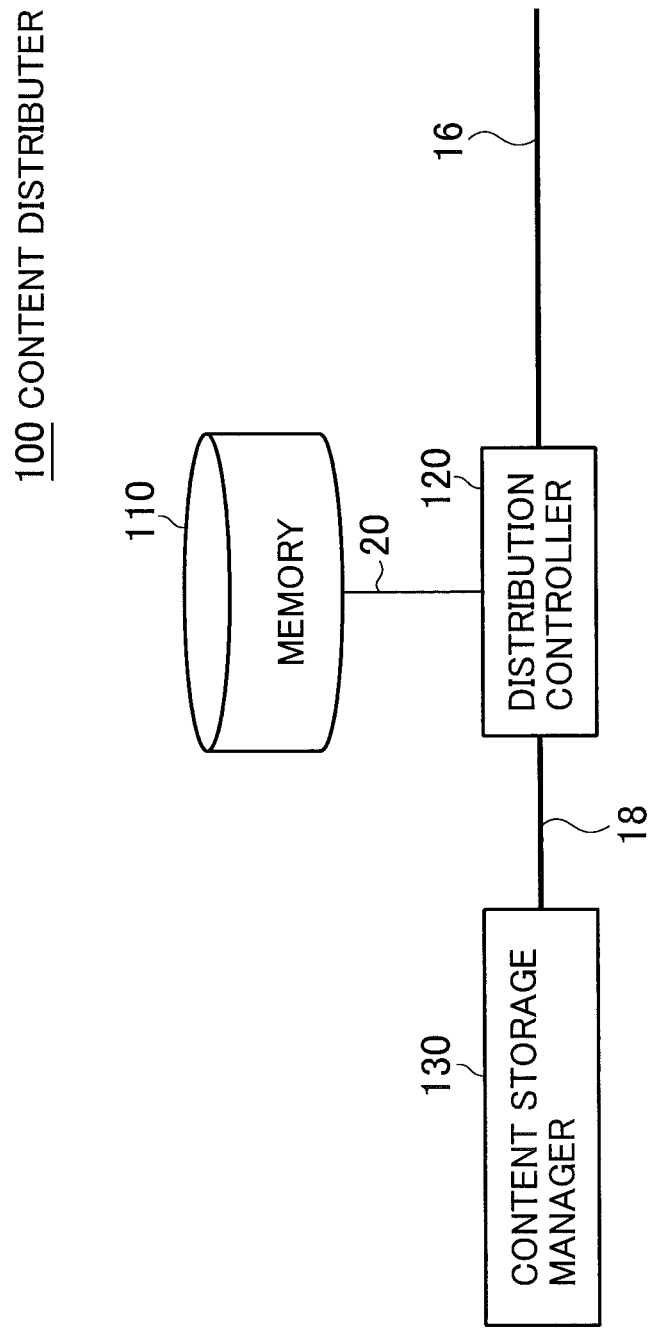
FIG. 2 is a schematic block diagram showing the internal configuration of a content distribution apparatus in the preferred embodiment shown in FIG. 1.

FIG. 2 is a schematic block diagram showing the internal configuration of the content distributer 100 of the instant embodiment. As shown in the figure, the content distributer 100 includes a memory 110, a distribution controller 120 and a content storage manager 130, which are interconnected as depicted. Like components are designated with the same reference numerals throughout the patent application, and will not repetitively be described for the sake of simplicity.

The distribution controller 120 is adapted for generally controlling the functions of the content distributer 100. The distribution controller 120 receives a video distribution request packet 16 and in turn generates a control signal 18 to inquire the content storage manager 130 about the storage location of the requested content in the memory 110.

When the distribution controller 120 acquires the storage location of the content as the control signal 18 from the content storage manager 130, it accesses on the basis of the acquired location 18 to the memory 110 to derive the video data 20 of the content from the memory 110. The distribution controller 120 then produces a packet including the video data of the content thus acquired from the memory 110 according to a real-time transport protocol (RTP), by way of example, to supply the packet 16 containing the video data, referred to as video data packet, at a predetermined distribution or transfer rate to the cache control server 200.

The content storage manager 130 is configured to manage storage locations of video data of contents to be stored in the memory 110. Upon receipt of an inquiry 18 about a storage location of a content from the distribution controller 120, the content storage manager 130 provides a signal representative of the storage location 18 of the content in the memory 110 to the distribution controller 120.

The memory 110 is adapted to store video data of contents. The memory 110 may be implemented by a storage device with high-speed read/write function, e.g. a cache memory device. The memory 110 is responsive to a request 20 from the distribution controller 120 to develop stored video data and supply the data 20 to the distribution controller 120.

Figure 3:
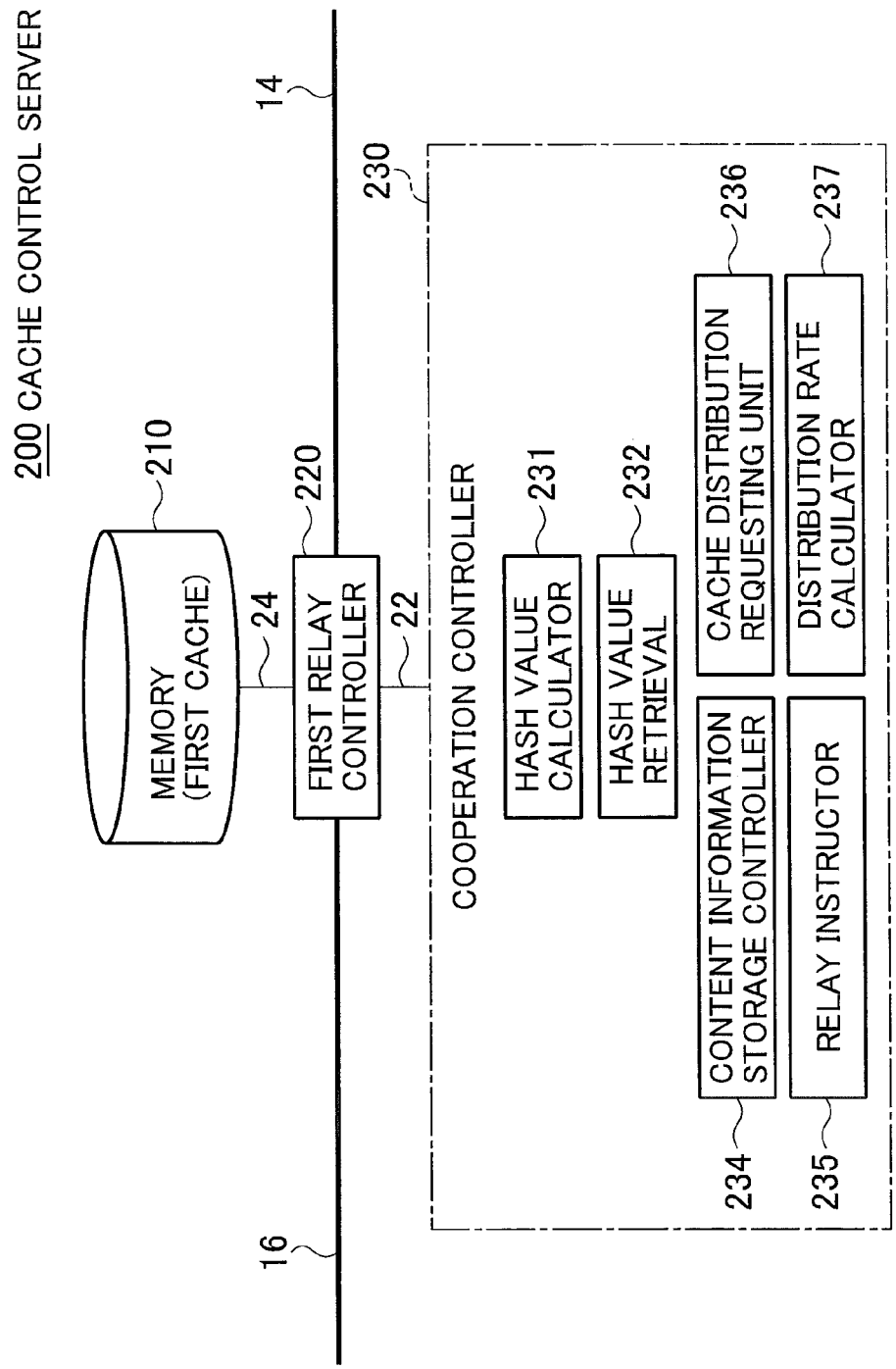
FIG. 3 is a schematic block diagram showing the internal configuration of a cache control server in the preferred embodiment.

FIG. 3 is a schematic block diagram showing the internal configuration of the cache control server 200 of the present embodiment. As seen from the figure, the cache control server 200 includes a memory or first cache 210, a first relay controller 220 and a cooperation controller 230, which are interconnected as shown.

The first relay controller 220 is adapted to control a relay function of the cache control server 200. The first relay controller 220 receives a video distribution request packet 14 meant for the content distributer 100 from the network 300 to deliver the received packet 14 to the content distributer 100.

The first relay controller 220 also receives a video data packet 16 from the content distributer 100 and in turn transfers the data packet 22 to the cooperation controller 230. Furthermore, the first relay controller 220 is adapted to relay the received video data packet 16 to the cache distribution server 400 on the network 300 or to discard the data packet 16 according to an instruction 22 given by the cooperation controller 230. The first relay controller 220 also sends the cache distribution request packet 14 on the network 300 to the cache distribution server 400 in response to the instruction 22 from the cooperation controller 230.

When the cooperation controller 230 receives the video data 22 from the first relay controller 220, the cooperation controller 230 uses the obtained video data 22 to calculate a hash value. The cooperation controller 230 further makes a determination on whether or not the calculated hash value thus obtained matches any of hash values stored in the memory 210, and, depending on a result from the determination, instructs the first relay controller 220 to relay the video data packet 16.

As can be seen from FIG. 3, the cooperation controller 230 is primarily structured by a hash value calculator 231, a hash value retrieval unit 232, a content information storage controller 234, a relay instructor 235, a cache distribution requesting unit 236 and a distribution rate calculator 237.

The hardware of the cooperation controller 230 can consist of, for instance, CPU (Central Processor Unit), ROM (Read-Only Memory), RAM (Random Access Memory), EEPROM (Electrically Erasable Programmable ROM) and I/O (input-output) interface, in which the CPU executes processing program sequences stored in the ROM to implement the features illustrated in FIG. 3. Such program sequences may be stored in a non-transitory computer-readable storage medium.

In this connection, the illustrative embodiment is depicted and described as configured by separate functional blocks, such as elements 234, 236 and so on. It is however to be noted that such a depiction and a description do not restrict those functions to an implementation only in the form of hardware but they may partially or entirely be implemented by software. That may also be the case with illustrative embodiments which will be described below. In this connection, the word "circuit" or "unit" may be understood not only as hardware, such as an electronics circuit, but also as a function that may be implemented by software installed and executed on a computer.

The hash value calculator 231 is adapted to divide the video data 16 of a content received from the content distributer 100 into sections, or segments, on the basis of the predetermined temporal unit, or unit of time, and uses the video data thus sectioned to calculate the hash values.

The calculation of the hash values by the hash value calculator 231 may be implemented by any known calculation methods which utilize hash functions. In general, data of contents is voluminous. Hence, high-resolution image data, when distributed, for example, may often cause a delay or the like in transmission, resulting in the disruption in stability of data transmission. In order to smooth the distribution of video data, the hash value calculator 231 is adapted to divide video data 16 of contents into sections.

In the illustrative embodiment, content data are divided into sections on the basis of a predetermined temporal unit, e.g. a predetermined length of time, but the present invention may not be limited to the specific embodiment. By way of example, video data of MPEG (Moving Picture Experts Group) format may be divided into sections on the basis of a certain data unit, for example, on a GOP (Group Of Picture) basis. The hash value calculator 231 may be adapted to calculate hash values from the entire sections of video data thus divided on the basis of a predetermined temporal unit. Alternatively, the calculator 231 may be adapted to use a predetermined amount of data counting from the beginning of the segments of video data, e.g. tens to hundreds of bytes, or data of a predetermined length of time, e.g. about one second, from the beginning of the data in order to calculate hash values.

The hash value retrieval unit 232 is dedicated to reference the memory 210 to determine whether or not the memory contains a hash value matching the hash value calculated by the hash value calculator 231.

The content information storage controller 234 is configured to store, when the hash value retrieval unit 232 fails to find in the memory 210 a hash value matching the hash value of the received video data 16, the content information 24 of those segments of the video data 16. The content information 24 of the segments of the video data 16 may include a hash value of the video data 16 thus sectioned, reception start time, reception end time and the size of the data, by way of example. Information or signals are designated with the reference numerals of connections on which they are conveyed.

The relay instructor 235 is adapted to instruct, when the hash value retrieval unit 232 fails to locate in the memory 210 a hash value matching the hash value of the received video data 16, the first relay controller 220 to relay or transfer video data packets 16 received from the content distributer 100 over the network 300 to the cache distribution server 400. In this connection, the relay instructor 235 further gives the following three instructions 22 to the first relay controller 220.

By the first instruction, the relay instructor 235 instructs the first relay controller 220 to relay video data packets 16 containing the segments of the video data at a transmission rate, described later, calculated by the distribution rate calculator 237.

By the second instruction, the relay instructor 235 instructs the first relay controller 220 to relay video data packets 16 containing the segments of the video data.

By the third instruction, the relay instructor 235 instructs the first relay controller 220 to insert the content information, such as a hash value, reception start time, reception end time and the size of the data, of the segments of the video data into the video data packets 16 containing the segments of the video data to transmit the resultant video data packets 16.

The cache distribution requesting unit 236 instructs the first relay controller 220, when the hash value retrieval unit 232 found in the memory 210 a hash value matching the hash value of the received video data, to send out a cache distribution request packet 14 including the content information which corresponds to the hash value.

In this case, the cache distribution requesting unit 236 causes information on a distribution or transmission rate obtained by the distribution rate calculator 237, described later, to be inserted into the cache distribution request packet to deliver the packet to the cache distribution server 400. Thus, the system is configured such that the distribution rate information of the cached video data is applied to the cache distribution server 400 so as to enable the distribution rate information to be used in transmitting the video data, i.e. content, to the terminal device 500.

The distribution rate calculator 237 is adapted for calculating a distribution rate of the segments of the video data. The distribution rate calculator 237 may be designed to calculate the distribution rate in any of a variety of methods applicable. In the illustrative embodiment, for example, a time duration of receiving video data calculated from the reception start time and reception end time included in content information as well as the data size of the video data may be used to calculate a distribution rate. For instance, when video data to be cached is received in a time period of ten seconds and has the data size of 20 Mbit, the distribution rate calculator 237 calculates a distribution rate of 2 Mbps.

The memory, or first cache, 210 is adapted to store content information of segments of video data sectioned on a temporal basis. The memory 210 may be implemented by a storage device with high-speed read/write capability, e.g. a cache memory. The memory 210 is responsive to the instructions 24 from the cooperation controller 230 to store and/or produce the content information 24 of the segments of the video data.

FIG. 4 schematically shows an example of content information 24 of video data segmented on the basis of the predetermined temporal unit of time to be stored in the memory, or first cache, 210. In the figure, the content information 24 of each segmented video data contains items "content hash value" 610, "reception start time" 620, "reception end time" 630 and "data size" 640.

For example, in FIG. 4, the line "hash value: 000000001" includes the video data reception start time "10:00:00:00" (hour:minute:second:millisecond), the reception end time "10:00:10:00", and the video data size "10,458,760" (bytes). The line "hash value: 000000002" is directed to another video data segment subsequent to "hash value: 000000001". In order to retain continuity in the content, the reception start time on the line "hash value: 000000002" is "10:00:10:00", which is continued from the reception end time on the line "hash value: 000000001".

When several content distribution servers, like the server 400, are connected to the network 300, the cache control server 200 can perform cache control on the several content distribution servers 400 over the network 300. In that case, the control server 200 may be adapted to control the content information for the respective content distribution servers 400 with the identifications, e.g. IP addresses, of those content distribution servers 400 associated with the content information.

Figure 5:
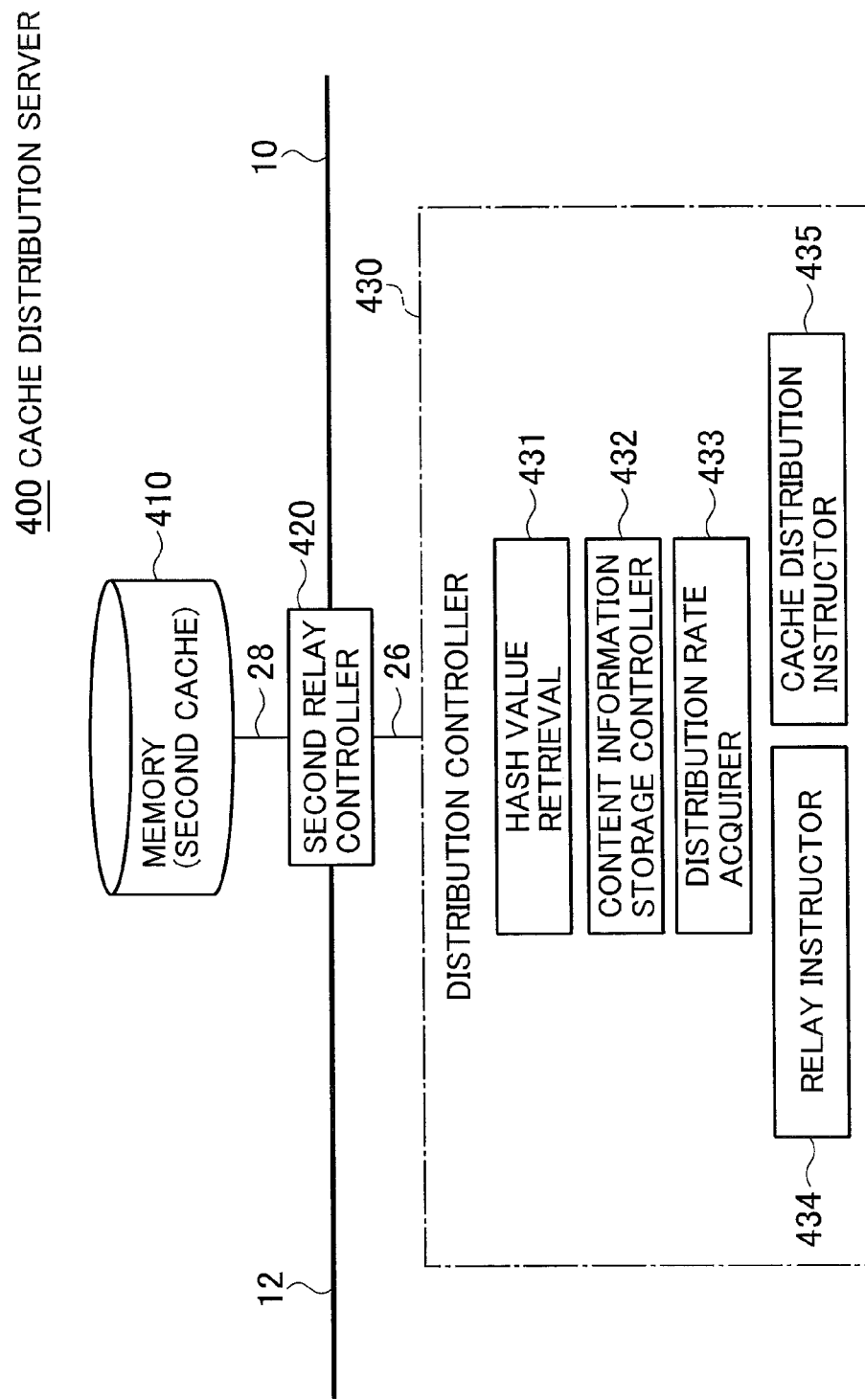
FIG. 5 is a schematic block diagram showing the internal configuration of a cache distribution server in the preferred embodiment.

FIG. 5 is a schematic block diagram showing the internal configuration of the cache distribution server 400 in the illustrative embodiment. As shown in the figure, the cache distribution server 400 includes a memory, or second cache, 410, a second relay controller 420 and a distribution controller 430, which are interconnected as illustrated.

The second relay controller 420 is adapted to control the relay function of the cache distribution server 400. The second relay controller 420 relays or transfers a video distribution request packet 10 sent from the terminal device 500 to the network 300. In addition, the second relay controller 420 receives from the cache control server 200 on the network 300 video data packets or cache distribution request packets 12 to supply information 26 contained in the received data packets to the distribution controller 430.

The second relay controller 420 is responsive to a relay instruction 26 issued by the distribution controller 430 to relay the received video data packets 12 to the terminal device 500, or read out video data 28 stored in the memory 410 and transfer video data packets 10 containing the read-out video data 28 to the terminal device 500.

The distribution controller 430 is configured to derive the information 26 included in the video data packets 12 from the second relay controller 420, and then make a determination on whether or not a hash value contained in the video data packets 12 matches any of hash values stored in the memory 410 to control the distribution of video data packets 10 in accordance with a result from the determination.

As shown in FIG. 5, the distribution controller 430 primarily includes a hash value retrieval unit 431, a content information storage controller 432, a distribution rate acquirer 433, a relay instructor 434 and a cache distribution instructor 435.

The hardware of the distribution controller 430 may consist of, for instance, CPU, ROM, RAM, EEPROM and I/O interface, in which the CPU executes processing program sequences stored in the ROM to implement the features shown in FIG. 5. Such program sequences may also be stored in a non-transitory computer-readable storage medium.

The hash value retrieval unit 431 is adapted to refer to the memory 410 to search there for a hash value that matches the hash value of a received video data packet 12.

The content information storage controller 432 is configured to store, when the hash value of the received video data 12 does not correspond to any of the hash values stored in the memory 410, the video data in association with the hash value, reception start time, reception end time and the size of data of the video data contained in the received video data packets 12 as content information 28 in the memory 410.

The distribution rate acquirer 433 is adapted for acquiring from a received cache distribution request packet 10 content information about the distribution rate of the video data packets 12 indicated by the cache distribution request as well as distribution rate information.

The relay instructor 434 is configured to instruct, when the hash value of the received video data 12 does not match any of the hash values stored in the memory 410, the second relay controller 420 to deliver video data included in the received video data packets 12. In this case, the relay instructor 434 instructs the second relay controller 420 to transmit the video data in the form of video data packets at a distribution rate that is calculated based on the reception period of time, i.e. duration, of the video data figured out from the reception start and end times and also the data size of that video data in question from among the content information, including the reception start and end times and the data size, of the video data packet 12 obtained by the distribution rate acquirer 433. For example, when a cache distribution request 26 is made on certain cached video data to be transmitted at a distribution rate of 2 Mbps, the video data 28 is transmitted at the rate of 2 Mbps. In this regard, the distribution rate acquirer 433 instructs the second relay controller 420 to delete the content information included in the video data packet 12 received from the cache server 200.

The cache distribution instructor 435 is configured to search, when the hash value of the received video data packet 12 matches any of the hash values stored in the memory 410, the memory 410 for content information associated with the matched hash value, and then instruct the second relay controller 420 to distribute the video data corresponding to the content information thus searched for. In this case, the cache distribution instructor 435 references the hash value of the content information derived by the distribution rate acquirer 433 to search the memory 410 for content information associated with that hash value, and instructs the second relay controller 420 to deliver the video data at a distribution or transfer rate that is calculated based on the reception period of time of the video data figured out from the reception start and end times and also the data size of that video data from among the content information thus searched for and including the reception start and end times and the data size obtained by the distribution rate acquirer 433.

Alternatively, the cache distribution instructor 435 may instruct the second relay controller 420 to deliver the video data at a distribution rate that is calculated based on the reception period of time of the video data figured out from the reception start and end times and also the data size of the video data from among the content information including the reception start and end times and the data size obtained by the distribution rate acquirer 433.

Further alternatively, the cache distribution instructor 435 may instruct the second relay controller 420 to distribute the video data at a distribution rate based on the distribution rate information acquired by the distribution rate acquirer 433.

Since the relay instructor 434 and the cache distribution instructor 435 are thus adapted to cause video data to be distributed at a distribution rate the cache control server 200 has asked for, the video data 10 can be transferred at a distribution rate close or substantially equal to the distribution rate defined by the content distributer 100. As a consequence, the video data 10 can be delivered in stable condition, and delays in video data transmission are thereby reduced. The user can thus enjoy the video at the distribution rate defined by the content distributer 100.

The memory or second cache 410 is designed for storing the content information 28 of segments of video data, sectioned on the basis of a predetermined unit of time, derived from the cache control server 200. The memory 410 also may be implemented by a storage device with high-speed read/write capability, e.g. a cache memory device. The memory 410 is responsive to instructions 26 from the distribution controller 430 to store and/or develop the content information 28 of segments of video data.

FIG. 6 schematically shows another example of content information 28 of video data segments sectioned on the basis of a predetermined unit of time to be stored in the memory or second cache 410. In the figure, the content information 28 of each segmented video data contains items "content hash value" 710, "reception start time" 720, "reception end time 730", "data size" 740 and "video data" 750.

For instance, in FIG. 6, in the fields "content hash value" 710, "reception start time" 720, "reception end time" 730 and "data size" 740, stored will respectively be the values of "content hash value" 610, "reception start time" 620, "reception end time" 630 and "data size" 640, which are derived from the cache control server 200.

In addition to those, as shown in FIG. 6, the memory 410 stores the "video data" 750 which is associated with the "content hash value" 710. That makes it possible for the cache distribution server 400 to transfer video data 12, if cached in the server 400, to the terminal device 500 in the form of video data 10.

Figure 7:
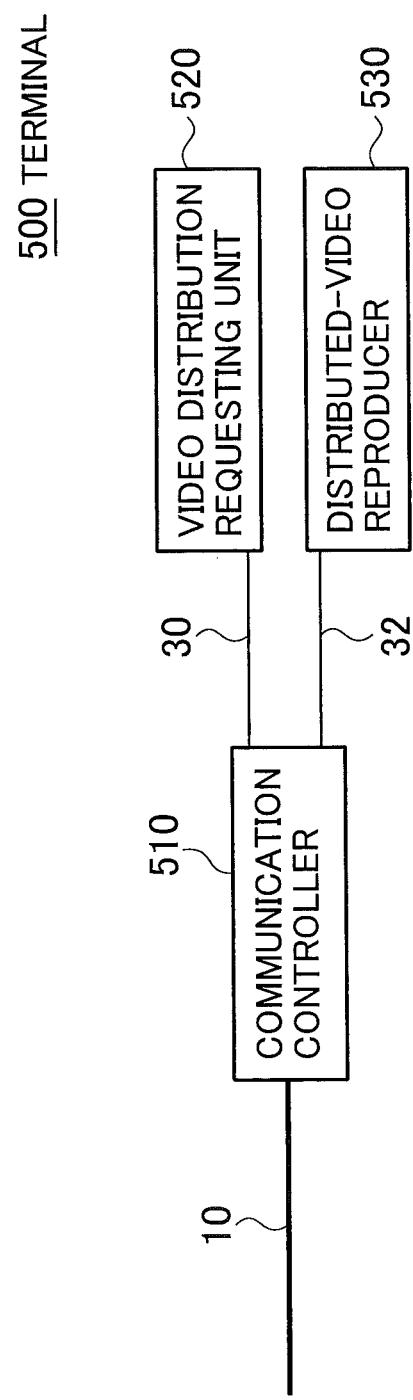
FIG. 7 is a schematic block diagram showing the internal configuration of a terminal device in the preferred embodiment.

FIG. 7 is a schematic block diagram showing the internal configuration of the terminal device 500 of the instant embodiment. In the figure, the terminal device 500 includes a communication controller 510, a video distribution requesting unit 520 and a distributed-video reproducer 530, which are interconnected as illustrated.

The video distribution requesting unit 520 is operative in response to operations carried out by the user to issue a video distribution request 30 to the content distributer 100.

The communication controller 510 is designed to receive a video distribution request 30 from the video distribution requesting unit 520 to produce a video distribution request packet addressed to the content distributer 100, and then send out the video distribution request packet 10. The communication controller 510 also receives video data packets 10 from the cache distribution server 400, and supplies video data 32 contained in the data packets 10 to the distributed-video reproducer 530.

The distributed-video reproducer 530 is adapted for reproducing, or visualizing, video from the video data 32 derived from the communication controller 510.

Now, in operation, the video distribution system 1 of the present embodiment will proceed to the video distribution processing as will be described with reference to sequence diagrams shown in FIGS. 8A-9B.

Figure 8A:
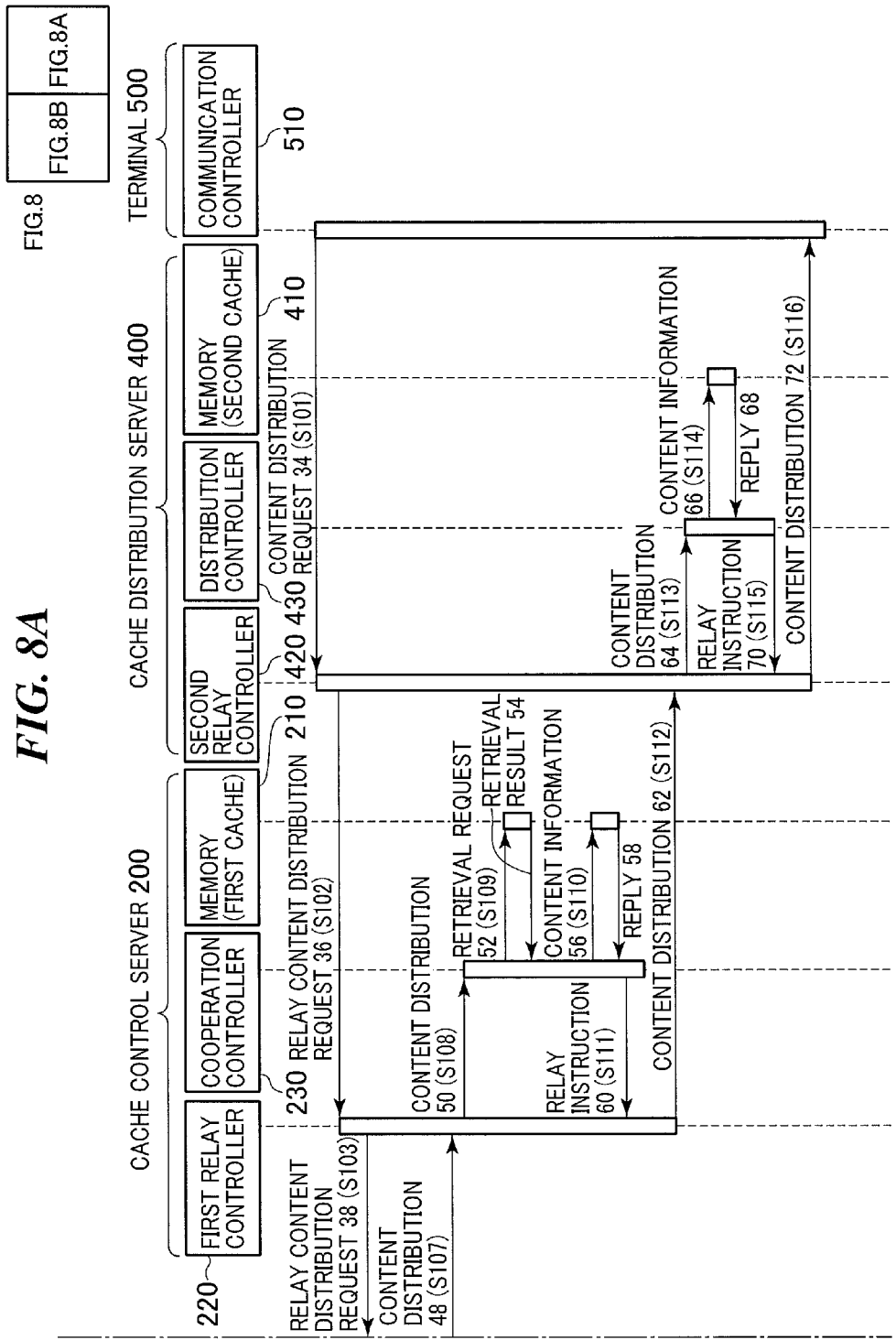

FIGS. 8A and 8B are a sequential chart useful for understanding how the terminal device 500 carries out the video distribution processing for requesting distribution of a video content for the first time.

In the terminal device 500, upon receipt of the designation of a content the user wants to watch, the video distribution requesting unit 520 sends a video distribution request 30 indicating the designated content to the communication controller 510.

The communication controller 510 in turn assembles a video distribution request packet including the received video distribution request 30 with its destination directed to the address of the content distributer 100, and delivers the video distribution request packet 34 (10) to the cache distribution server 400 (step S101).

In the cache distribution server 400, the second relay controller 420 receives the video distribution request packet 34 (10) from the terminal device 500 to relay the received request packet 34 (10) in the form of video distribution request packet 36 (14) over the network 300 to the cache control server 200 (step S102).

The video distribution request packet 36 (14) is thus supplied through the network 300 to the cache control server 200. In the cache control server 200, the first relay controller 220 receives the video distribution request packet 36 (14) from the network 300 to transfer the received packet 36 (14) in the form of video distribution request packet 38 (16) to the content distributer 100 (step S103).

In the content distributer 100, FIG. 8B, the distribution controller 120 receives the video distribution request packet 38 (16) from the cache control server 200, FIG. 8A. The distribution controller 120 in turn analyzes the received request packet 38 (16) to feed the content storage manager 130 with a storage location request 40 (18) of the designated content as an inquiry (step S104).

The content storage manager 130 searches the memory 110 for the storage location of the content request 40 (18) sent by the distribution controller 120 to inform the distribution controller 120 of the storage location of the content in the memory 110 as a retrieval result 42 (18) (step S105). By way of example, the content storage manager 130 manages content identification information, e.g. a content identification (ID) in association with the storage location of the content cached in the memory 110, thus being able to locate the storage location corresponding to the content identification information requested.

On the basis of the storage location 42 (18) informed by the content storage manager 130, the distribution controller 120 reads out from the memory 110 the video data 44 (20) of that content (step S106). The distribution controller 120 then distributes, e.g. according to an RTP (Real-time Transport Protocol), video data packets that include the video data of the content concerned, as depicted by a content distribution 48 (16) in step S107.

The cache control server 200, FIG. 8A, receives by the first relay controller 220 the video data packets, as depicted by content distribution 48 (16), sent from the content distributer 100, FIG. 8B. The first relay controller 220 transfers the video data, as depicted by the content distribution 50 (22), contained in the received video data packets 48 (16) to the cooperation controller 230 (step S108).

The cooperation controller 230 in turn calculates the hash value of the obtained video data 22. The cooperation controller 230 sends a retrieval request 52 to the memory 210, subsequently makes a determination on whether or not the calculated hash value matches any of the hash values (24, 22) stored in the memory or first cache 210, as represented with a retrieval result 54 in step S109.

In the example described so far, since the request for video distribution for the content is issued for the first time, the memory 210 contains no hash value matching the calculated hash value. Thus, the cooperation controller 230 cannot find such a hash value that matches the calculated hash value.

Consequently, the cooperation controller 230 controls the memory 210 to store the content information 56 of the video data 48 (16) received from the content distributer 100 (step S110), and will receive a reply 58 indicative of completion of storage of the memory 210. The cooperation controller 230 instructs the first relay controller 220 to relay the video data packet sent from the content distributer 100 (Relay Instruction 60, step S111).

The cooperation controller 230 divides the received content into segments or sections on the basis of the predetermined unit of time, e.g. every 10 seconds, and calculates the hash value of each segment of divided video data. The cooperation controller 230 then stores in the memory 210 the hash value, reception start time, reception end time and data size in the form of content information 56. In addition, when the cooperation controller 230 instructs the first relay controller 220 to relay the video data packet 48 (16) received from the content distributer 100, the controller 230 further issues the following three instructions to the first relay controller 220.

The cooperation controller 230 instructs the first relay controller 220 according to the first instruction 22 to relay, as represented by a content distribution 62, video data packets 48 (16) containing the segments of video data either at the transmission rate at which the segments of the video data are received in the form of video data packets 48 (16) received from the content distributer 100 or at a transmission rate calculated by the distribution rate calculator 237.

The cooperation controller 230 instructs the first relay controller 220 according to the second instruction 22 to relay the video data packets 48 (16) containing the segments of video data, as depicted with the content distribution 62.

The cooperation controller 230 instructs the first relay controller 220 according to the third instruction 22 to insert the content information of the segments of video data, i.e. information on a hash value, reception start time, reception end time and the size of data, into the video data packets of the segments of video data, thus transmitting the video data packets 48 (16).

In response to the relay instructions 22 given by the cooperation controller 230, the first relay controller 220 delivers the video data packets 48 (16) received from the content distributer 100 over the network 300 to the cache distribution server 400, as depicted with the content distribution 62 in step S112.

The cache distribution server 400 receives the video data packets 62 (12) by means of the second relay controller 420. The second relay controller 420 supplies the video data 26 in the received data packets 62 (12) to the distribution controller 430 (Content Distribution 64, step S113).

The distribution controller 430 searches the memory or second cache 410 to determine whether or not the hash value included in the video data packet 64 (26) sent from the second relay controller 420 is equal to one stored in the memory, the processing not being shown in FIG. 8A. Since this is the first video distribution request 28 in the example of operation, such a hash value cannot be located in the memory. Thus the distribution controller 430 stores in the memory 410 as content information 66 (28) the hash value, reception start time, reception end time, data size and the video data contained in the data packet 64s (26) (step S114). Subsequently, the memory or second cache 410 forwards a reply 68 to the second relay controller 420.

The distribution controller 430 then instructs the second relay controller 420 to deliver the video data packets 62 (12) received by the second relay controller 420 to the terminal device 500 (Relay Instruction 70 (26), step S115). Additionally, when the distribution controller 430 instructs the second relay controller 420 to relay the video data packets 62 (12) received from the cache control server 200, the controller 430 further issues the following two instructions 70 (26) to the second relay controller 420.

The distribution controller 430 instructs the second relay controller 420 according to the first instruction 26 to deliver the video data on video data packets 10, as depicted with a content distribution 72, at a distribution rate calculated based on the reception period of time of the video data figured out from the reception start and end times and also the data size of that video data from among the content information, including the reception start and end times and the data size, of the video data packet 62 (12) obtained by the distribution rate acquirer 433.

The distribution controller 430 instructs the second relay controller 420 according to the second instruction 26 to delete the content information included in the video data packets 62 (12) received from the cache server 200. In response to these instructions 26 from the distribution controller 430, the second relay controller 420 transfers the video data packet 72 (10) to the communication controller 510 of the terminal device 500 (step S116).

In this way, the communication controller 510 of the terminal device 500 receives the content 72 (10) transferred by the second relay controller 420, whereby the distributed-video reproducer 530 can stably reproduce the video.

Figure 9B:
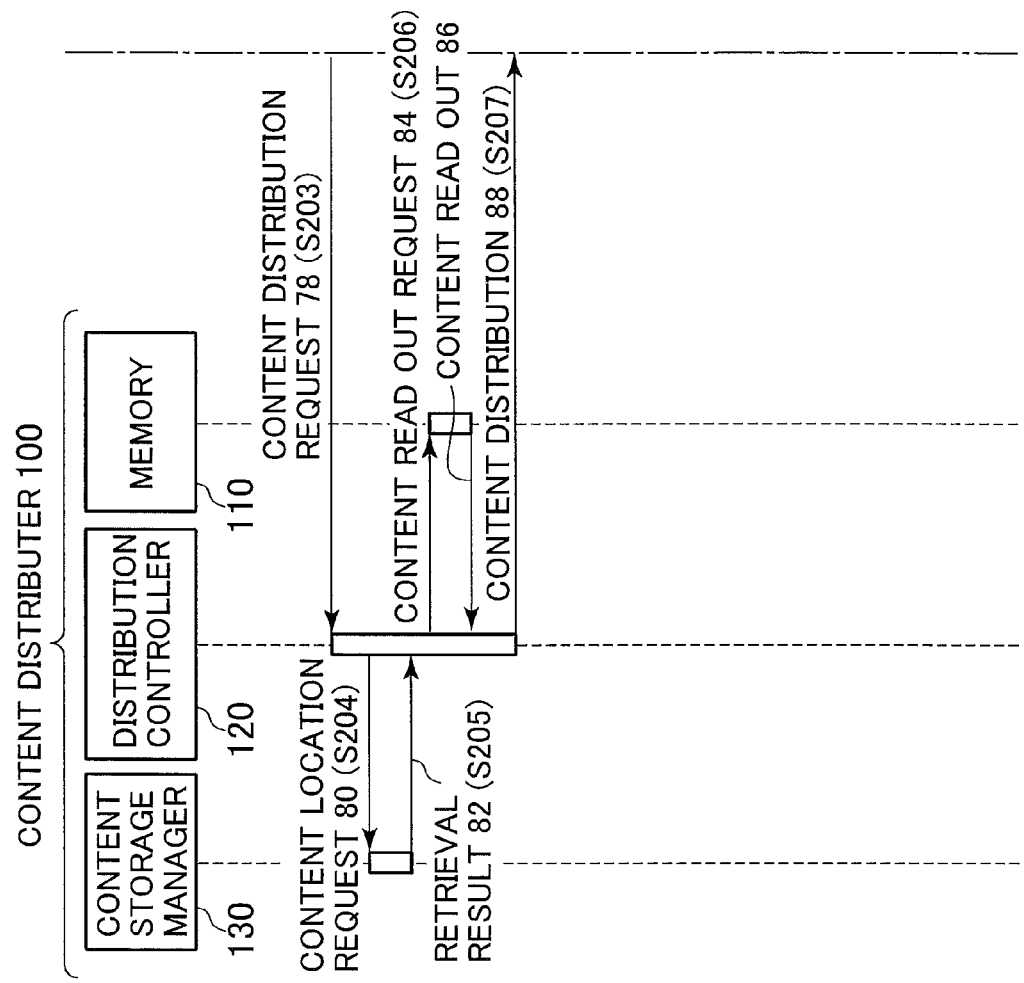

In the following, it will be described in detail how video distribution proceeds when the terminal device 500 requests again the distribution of the same video content. FIGS. 9A and 9B are, when combined as shown in FIG. 9, a sequential chart useful for understanding the video distribution processing to be conducted when the terminal device 500 repetitively requests the distribution of the same video content.

When the user wants to watch the content he or she watched before, he or she operates the terminal device 500 accordingly. The video distribution requesting unit 520 of the terminal device 500 receives the designation of the content from the user and sends a video distribution request 30 designating that content to the communication controller 510.

The communication controller 510 in turn produces a video distribution request packet including the received video distribution request with its destination being defined by the address information of the content distributer 100, and then delivers the produced request packet 74 (10) to the cache distribution server 400 (step S201).

The cache distribution server 400 receives on the second relay controller 420 the video distribution request packet 10 as a content distribution request 74 from the terminal device 500. The second relay controller 420 in turn transmits the received packet 74 (10) as a content distribution request 76 (14) over the network 300 to the cache control server 200 (step S202).

As above, the video distribution request packet 76 (14) is supplied through the network 300 to the cache control server 200. In the cache control serve 200, the first relay controller 220 receives the request packet 76 (14) sent on the network 300 to transfer the packet 76 (14) to the content distributer 100, FIG. 9B, as a content distribution request 78 (16) (step S203).

In the content distributer 100, the distribution controller 120 receives the video distribution request packet 78 (16) sent from the cache control server 200, FIG. 9A. The distribution controller 120 analyzes the request packet 78 (16) and inquires the content storage manager 130 about the storage location of the designated content (Content Location Request 80 (18), step S204).

The content storage manager 130 searches the memory 110 for the storage location of the content inquired by the distribution controller 120, and replies to the distribution controller 120 by the storage location of the inquired content in the memory 110 (Retrieval Result 82 (18), step S205).

On the basis of the storage location, or the Retrieval Result 82 (18), obtained from the content storage manager 130, the distribution controller 120 sends a request for reading out a content 84 (20) to the memory 110 to thereby read out the video data 86 (20) of the content from the memory 110 (step S206). Subsequently, the distribution controller 120 delivers according to an RTP a video data packet 88 (16) that contains the video data of the content in question (step S207).

The cache control server 200 in turn receives by means of the first relay controller 220 the video data packet 88 (16) sent from the content distributer 100, FIG. 9B. The first relay controller 220 then transfers the video data 90 (22) in the received data packet 88 (16) to the cooperation controller 230 (step S208).

The cooperation controller 230 calculates the hash value of the derived video data 90 (22). Then the cooperation controller 230 searches the memory 210 for the hash value stored in the memory which matches the calculated hash value (Retrieval Request 92 (22, 24), step S209).

The cooperation controller 230 reads out from the memory 210 the content information 24 corresponding to the calculated hash value, as the retrieval result 94 (24, 22), and instructs the first relay controller 220 to send out a cache distribution request packet 96 (22), in which the content information is included (step S210). In this context, the content information 24 includes a hash value, reception start time, reception end time and a size of data.

The cooperation controller 230 also reads out from the memory 210 the content information 24 associated with the calculated hash value to calculate a distribution rate based on the reception period of time of the video data figured out from the reception start and end times and also the data size of that video data from among the content information (24, 22), including the reception start and end times and the data size. The cooperation controller 230 subsequently instructs the first relay controller 220 to transmit a cache distribution request packet 96 (22) including information about the distribution rate thus calculated (step S210).

In response to the relay instructions 22 from the cooperation controller 230, the first relay controller 220 delivers the cache distribution request packet 98 (14) including the content information and the distribution rate information over the network 300 to the cache distribution server 400 (step S211).

The cache distribution server 400 receives the packet 98 (12) on the second relay controller 420 from the first relay controller 220. The second relay controller 420 in turn supplies the information 102 (26) contained in the received packet 98 (12) to the distribution controller 430 (step S212).

The distribution controller 430 searches the memory or second cache 410 for confirming whether or not the hash value contained in the packet 102 (26) supplied from the second relay controller 420 is stored therein (Retrieval Request 104 (26, 28), step S213), and receives a retrieval result 106 (28, 26).

In the present case, the distribution of the content is requested for a second time (Cache Distribution Request 102), so that the distribution controller 430 searches for the corresponding hash value (Retrieval Request 104 and Retrieval Result 108). Thus, the distribution controller 430 requests the second relay controller 420 for the distribution of the cache of the video data which is associated with the hash value of the packet (Content Distribution Request 108 (26), step S214). In addition, when the distribution controller 430 requests the second relay controller 420 for asking the cache distribution server 400 for cache distribution, the distribution controller 430 further requests the second relay controller 420 for the following matters.

Specifically, the distribution controller 430 sends a content distribution request 108 to thereby read out content information 106 associated with the hash value searched for in the memory 410 to the second relay controller 420, and deliver the video data 116 associated with the hash value in the form of video data packets 114 at a distribution rate calculated on the basis of the reception period of time of the video data figured out from the reception start and end times as well as the data size of that video data from among the content information 106, including the reception start and end times and the data size.

Alternatively, the distribution controller 430 requests the second relay controller 420 to deliver the video data 114 associated with the hash value on video data packets 116 at a distribution rate calculated on the basis of the reception period of time of the video data figured out from the reception start and end times and also the data size of that video data from among the content information 106, including the reception start and end times and the data size, acquired by the distribution rate acquirer 433.

Yet alternatively, the distribution controller 430 requests the second relay controller 420 to deliver the video data 114 associated with the hash value on video data packets 116 at a distribution rate defined on the basis of the distribution rate information acquired by the distribution rate acquirer 433.

In short, in response to the requests of the distribution controller 430, the second relay controller 420 reads out from the memory 410 the video data 114 (28) associated with the hash value stored in the memory 410 (step S215), and then delivers video data packets 116 (10) that include the read-out video data 114 (28) to the communication controller 510 of the terminal device 500 (step S216).

In this way, the communication controller 510 of the terminal device 500 receives the content 116 (10) transmitted by the second relay controller 420, whereby the distributed-video reproducer 530 can stably replay the video.

In summary, the illustrative embodiment has an advantage in the content distribution of the same contents for a second time in such a way as to diminish the video traffic between the cache control server 200 and the cache distribution server 400.

Furthermore, in the illustrative embodiment, the video traffic is provided by the cache distribution server 400 to the terminal device 500 at a transfer rate, i.e. distribution rate, which is close or substantially equal to the transmission rate at which the content distributer 100 transmits the video traffic. There is therefore another advantage that video data can be delivered in stable condition without causing delays in watching the video.

Furthermore, since the illustrative embodiment is implemented so as to store content data, or video data, only, contents in the form of, e.g. RTP or HTTP (Hyper Text Transfer Protocol) may be distributed with the similar advantages, irrespectively of the protocols thereof.

Some of the variations from the above-described embodiment have been presented so far. The present invention may not be limited thereto but applied to the following variations.

With the configuration of the above embodiment, if the hash value retrieval unit 232 has confirmed the memory or first cache 210 containing a hash value matching the hash value of received video data, the cache distribution requesting unit 236 may instruct the first relay controller 220 to transmit a cache distribution request packet 14 that includes the hash value contained in the content information, which corresponds to the hash value thus found, without including the reception start and reception end times and the size of data contained in the content information as well as the distribution rate information.

In this connection, the cache distribution instructor 435 uses the hash value contained in the content information acquired by the distribution rate acquirer 433 to search the memory or second cache 410 for content information (28, 26) associated with this hash value, and further uses the reception period of time of the video data figured out based on the reception start and end times and the size of that video data from among the reception start and end times and the size of data included in the content information thus searched for (28, 26) to calculate a distribution rate so as to distribute the video data 10 at the calculated rate.

In this case, the operation steps S210 to S211, FIG. 9A, will proceed as follows. The cooperation controller 230 instructs the first relay controller 220 to read out content information (24, 22) associated with the calculated hash value from the memory 210 to send out a cache distribution request packet 14 that includes the hash value contained in the content information (24, 22), without including the reception start and end times and the size of data contained in the content information as well as the distribution rate information (step S210).

In turn, the first relay controller 220 transmits, in response to the relay instruction 22 from the cooperation controller 230, a cache distribution request packet 14 including the hash value on the network 300 to the cache distribution server 400 (step S211).

In addition, in the operation steps S214 to S216, when the distribution controller 430 requests the second relay controller 420 to ask the cache distribution server 400 for cache distribution, the distribution controller 430 instructs the second relay controller 420 to read out content information (28, 26) associated with the located hash value in the memory 410 and deliver video data associated with the hash value on video data packets 10 at a distribution rate calculated on the basis of the reception period of time of the video data figured out from the reception start and end times and also the data size of the video data from among the content information (28, 26), including the reception start and end times and the data size (step S214).

In response to the request made by the distribution controller 430, the second relay controller 420 reads out from the memory 410 the video data 28 associated with the hash value stored in the memory 410 (step S215), and then delivers video data packets 10 that include the read-out video data 28 to the communication controller 510 of the terminal device 500 (step S216).

The above-described embodiment may be modified such that, when the hash value retrieval unit 232 has confirmed the memory 210 includes a hash value matching the hash value of the received video data, the cache distribution requesting unit 236 instructs the first relay controller 220 to send a cache distribution request packet 14 that includes the content information corresponding to the hash value thus found but not distribution rate information.

In this connection, with the modification of the embodiment, the cache distribution instructor 435 may use the hash value contained in the content information acquired by the distribution rate acquirer 433 to search the memory 410 for content information associated with this hash value, and further use the reception period of time of the video data figured out based on the reception start and end times and also the size of the video data from among the reception start and end times and the size of data included in the content information searched for (28, 26) to calculate a distribution rate in order to distribute the video data 10 at the calculated rate.

Alternatively, the cache distribution instructor 435 may use the reception period of time of the video data figured out based on the reception start and end times and also the size of the video data from among the reception start and end times and the size of data included in the content information acquired by the distribution rate acquirer 433 to calculate a distribution rate so as to distribute the video data 10 at the calculated rate.

In this case, in the operation steps S210 to S211, FIG. 9A, the cooperation controller 230 instructs the first relay controller 220 to read out the content information 24 associated with the calculated hash value from the memory 210 to send out a cache distribution request packet 14 that includes the content information but not the distribution rate information (step S210).

Further in the operation, the first relay controller 220 transmits, in response to the relay instruction 22 from the cooperation controller 230, the cache distribution request packet 14 including the content information on the network 300 to the cache distribution server 400 (step S211).

In addition, in the operation steps S214 to S216, when the distribution controller 430 requests the second relay controller 420 to ask the cache distribution server 400 for cache distribution, the distribution controller 430 instructs the second relay controller 420 to read out content information 28 associated with the hash value searched for in the memory 410 and deliver video data associated with the hash value on video data packets 10 at a distribution rate calculated on the basis of the reception period of time of the video data figured out from the reception start and end times and also the data size of the video data from among the content information 28 containing the reception start and end times and the data size.

Alternatively, the distribution controller 430 may request the second relay controller 420 to deliver the video data associated with the hash value on video data packets 10 at a distribution rate calculated on the basis of the reception period of time of the video data figured out from the reception start and end times and also the data size of the video data from among the content information containing the reception start and end times and the data size, which is acquired by the distribution rate acquirer 433 (step S214).

In response to the request made by the distribution controller 430, the second relay controller 420 reads out from the memory 410 video data 28 associated with the hash value stored in the memory 410 (step S215), and then transmits video data packets 10 that include the read-out video data 28 to the communication controller 510 of the terminal device 500 (step S216).

The above-described embodiment may be modified so that, when the hash value retrieval unit 232 has confirmed the memory 210 includes a hash value matching the hash value of the received video data, the cache distribution requesting unit 236 instructs the first relay controller 220 to transmit a cache distribution request packet 14 that includes the hash value contained in the content information and the distribution rate information, which correspond to the hash value thus found without including the reception start and end times and the size of data contained in the content information.

In this connection, the cache distribution instructor 435 may instruct the first relay controller 220 to distribute the video data 14 at a distribution rate based on the distribution rate information acquired by the distribution rate acquirer 433.

In this case, in the operation steps S210 to S211, the cooperation controller 230 may instruct the first relay controller 220 to read out content information 24 associated with the calculated hash value from the memory 210 to send out a cache distribution request packet 14 that includes the hash value contained in the content information 24 and the distribution rate information, without including the reception start and end times and the size of data contained in the content information (step S210).

Further in the operation, the first relay controller 220 may transmit, in response to the relay instruction 22 from the cooperation controller 230, a cache distribution request packet 14 including the hash value and the distribution rate information over the network 300 to the cache distribution server 400 (step S211).

Additionally, in the operation steps S214 to S216, when the distribution controller 430 requests the second relay controller 420 ask the cache distribution server 400 for cache distribution, the distribution controller 430 may request the second relay controller 420 to deliver video data associated with the hash value on video data packets 10 at a distribution rate calculated on the basis of the distribution rate information acquired by the distribution rate acquirer 433 (step S214).

In response to the request made by the distribution controller 430, the second relay controller 420 reads out from the memory 410 the video data associated with the hash value stored in the memory 410 (step S215), and then transmits video data packets 10 that include the read-out video data to the communication controller 510 of the terminal device 500 (step S216).

In the above-described modified embodiment, video data to be cached are segmented on a temporal basis. Alternatively, video data may be sectioned on different unit bases, e.g. on the basis of the size of received data or of the breakpoints of video data, such as PES (Packetized Elementary Stream), frames or GOP of video data, thereby attaining the same advantages as the earlier-described embodiment.

The above embodiment is adapted such that the cache control server 400 stores as content information the reception start and end times and the size of data of the video data to be cached. Alternatively, the time stamp of RTP packets may be stored for instance so far as the continuity of contents can be retained.

The entire disclosure of Japanese patent application No. 2012-160911 filed on Jul. 19, 2012, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A video distribution apparatus comprising:
    a memory caching a segment of video data into which video data received from a communication network is sectioned on a basis of a predetermined unit, and storing at least video identifying information identifying the segment of video data;

a distribution controller operative in response to a cache distribution request received from the network for deriving the video identifying information contained in the cache distribution request, and controlling relay distribution on the basis of the obtained video identifying information; and a relay controller receiving the cache distribution request to supply the received cache distribution request to said distribution controller, and obtaining the segment of video data associated with the video identifying information from said memory to transfer the obtained segment of video data to a requester at a transfer rate defined on the segment of video data in a vicinity of a source of the video data, wherein said memory stores reception time and a size of the segment of video data in the vicinity of the source, said distribution controller calculates the transfer rate in the vicinity of the source on the basis of the reception time and the size of the segment of video data associated with the video identifying information, and said relay controller transfers the segment of video data at the transfer rate calculated by said distribution controller.

2. A non-transitory computer-readable storage medium storing a video distribution program which controls a computer to cache in a memory a segment of video data into which video data received from a communication network is sectioned on a basis of a predetermined unit and to store at least video identifying information identifying the segment of video data, said program further controlling the computer to function as:

a distribution controller operative in response to a cache distribution request received from the network for deriving the video identifying information contained in the cache distribution request, and controlling relay distribution on the basis of the obtained video identifying information; and a relay controller receiving the cache distribution request to supply the received cache distribution request to said distribution controller, and obtaining the segment of video data associated with the video identifying information from said memory to transfer the obtained segment of video data to a requester at a transfer rate defined on the segment of video data in a vicinity of a source of the video data, wherein said memory stores reception time and a size of the segment of video data in the vicinity of the source, said distribution controller calculates the transfer rate in the vicinity of the source on the basis of the reception time and the size of the segment of video data associated with the video identifying information, and said relay controller transfers the segment of video data at the transfer rate calculated by said distribution controller.

3. A video distribution method in a video distribution apparatus, said apparatus comprising:

a memory caching a segment of video data into which video data received from a communication network is sectioned on a basis of a predetermined unit, and storing at least video identifying information identifying the segment of video data;

a distribution controller operative in response to a cache distribution request received from the network for deriving the video identifying information contained in the cache distribution request, and controlling relay distribution on the basis of the obtained video identifying information; and a relay controller receiving the cache distribution request to supply the received cache distribution request to said distribution controller, and obtaining the segment of video data associated with the video identifying information from said memory to transfer the obtained segment of video data at a transfer rate defined on the segment of video data in a vicinity of a source of the video data, wherein said memory stores reception time and a size of the segment of video data in the vicinity of the source, said method comprising:

receiving the cache distribution request by said relay controller, and supplying the received cache distribution request to said distribution controller;

obtaining by said distribution controller the video identifying information contained in the cache distribution request and controlling relay distribution on the basis of the obtained video identifying information;

reading out by said distribution controller from said memory the cached segment of video data associated with the obtained video identifying information;

calculating by said distribution controller the transfer rate in the vicinity of the source on the basis of the reception time and the size of the segment of video data associated with the video identifying information; and transferring by said relay controller the segment of video data at the transfer rate calculated by said distribution controller.

4. A cache controlling apparatus receiving video data near a source of the video data, comprising:

a cooperation controller dividing the received video data into at least one segment of video data on a basis of a predetermined unit, and obtaining video identifying information identifying the segment of video data;

a memory storing the video identifying information of the segment of video data in association with reception time and a size of the segment of video data;

said cooperation controller determining whether or not said memory contains the video identifying information matching the obtained video identifying information, and outputting a control signal representative of a result of determination; and a relay controller operative in response to the control signal for transmitting, when said memory contains the video identifying information matching the obtained video identifying information, a cache distribution request containing at least the video identifying information, wherein said relay controller receives the video data, and supplies the received video data to said cooperation controller, said cooperation controller obtains the video identifying information of the segment of video data, wherein said relay controller stores the video identifying information of the segment of video data in association with reception time and a size of the segment of video data in said memory, when said cooperation controller determines that said memory does not contain the video identifying information matching the obtained video identifying information, and said relay controller transfers the cache distribution request containing at least the video identifying information, when said memory contains the video identifying information matching the obtained video identifying information.

5. A non-transitory computer-readable storage medium storing a cache control program which controls a computer to function as a cache controlling apparatus receiving video data near a source of the video data, said apparatus comprising:

a cooperation controller dividing the received video data into at least one segment of video data on a basis of a predetermined unit, and obtaining video identifying information identifying the segment of video data;

a memory storing the video identifying information of the segment of video data in association with reception time and a size of the segment of video data;

said cooperation controller determining whether or not said memory contains the video identifying information matching the obtained video identifying information, and outputting a control signal representative of a result of determination; and a relay controller operative in response to the control signal for transmitting, when said memory contains the video identifying information matching the obtained video identifying information, a cache distribution request containing at least the video identifying information, wherein said relay controller receives the video data, and supplies the received video data to said cooperation controller, said cooperation controller obtains the video identifying information of the segment of video data, wherein said relay controller stores the video identifying information of the segment of video data in association with reception time and a size of the segment of video data in said memory, when said cooperation controller determines that said memory does not contain the video identifying information matching the obtained video identifying information, and said relay controller transfers the cache distribution request containing at least the video identifying information, when said memory contains the video identifying information matching the obtained video identifying information.

6. A cache control method in a cache controlling apparatus receiving video data near a source of the video data, said apparatus comprising:

a cooperation controller dividing the received video data into at least one segment of video data on a basis of a predetermined unit, and obtaining video identifying information identifying the segment of video data;

a memory storing the video identifying information of the segment of video data in association with reception time and a size of the segment of video data;

said cooperation controller determining whether or not said memory contains the video identifying information matching the obtained video identifying information, and outputting a control signal representative of a result of determination; and a relay controller operative in response to the control signal for transmitting, when said memory contains the video identifying information matching the obtained video identifying information, a cache distribution request containing at least the video identifying information, said method comprising:

receiving by said relay controller the video data, and supplying the received video data to said cooperation controller;

obtaining by said cooperation controller the video identifying information of the segment of video data;

determining by said cooperation controller whether or not said memory contains the video identifying information matching the obtained video identifying information, and outputting the control signal representative of a result of determination;

storing by said relay controller in said memory, when said cooperation controller determines that said memory does not contain the video identifying information matching the obtained video identifying information, the video identifying information of the segment of video data in association with reception time and a size of the segment of video data; and transmitting by said relay controller, when said memory contains the video identifying information matching the obtained video identifying information, the cache distribution request containing at least the video identifying information.

7. A video distribution system comprising a cache controlling apparatus receiving video data near a source of the video data and a video distribution apparatus arranged near a requester of video distribution, wherein said cache controlling apparatus comprises:

a cooperation controller dividing the received video data into at least one segment of video data on a basis of a predetermined unit, and obtaining video identifying information identifying the segment of video data;

an information memory storing the video identifying information of the segment of video data in association with reception time and a size of the segment of video data;

said cooperation controller determining whether or not said information memory contains the video identifying information matching the obtained video identifying information, and outputting a control signal representative of a result of determination; and a first relay controller operative in response to the control signal for transmitting, when said information memory contains the video identifying information matching the obtained video identifying information, a cache distribution request containing at least the video identifying information, said video distribution apparatus comprising:

a cache memory caching the segment of video data, when received from a communication network, and storing at least the video identifying information identifying the segment of video data;

a distribution controller operative in response to a cache distribution request received from the network for deriving the video identifying information contained in the cache distribution request, and controlling relay distribution on the basis of the obtained video identifying information; and a second relay controller receiving the cache distribution request to supply the received cache distribution request to said distribution controller, and obtaining the segment of video data associated with the video identifying information from said cache memory to transfer the obtained segment of video data to a requester at a transfer rate defined on the segment of video data in a vicinity of a source of the video data.

8. A video distribution method in a video distribution system comprising a cache controlling apparatus receiving video data near a source of the video data and a video distribution apparatus arranged near a requester of video distribution, wherein said cache controlling apparatus comprises:

a cooperation controller dividing the received video data into at least one segment of video data on a basis of a predetermined unit, and obtaining video identifying information identifying the segment of video data;

an information memory storing the video identifying information of the segment of video data in association with reception time and a size of the segment of video data;

said cooperation controller determining whether or not said information memory contains the video identifying information matching the obtained video identifying information, and outputting a control signal representative of a result of determination; and a first relay controller operative in response to the control signal for transmitting, when said information memory contains the video identifying information matching the obtained video identifying information, a cache distribution request containing at least the video identifying information, said video distribution apparatus comprising:

a cache memory caching the segment of video data, when received from a communication network, and storing at least the video identifying information identifying the segment of video data;

a distribution controller operative in response to a cache distribution request received from the network for deriving the video identifying information contained in the cache distribution request, and controlling relay distribution on the basis of the obtained video identifying information; and a second relay controller receiving the cache distribution request to supply the received cache distribution request to said distribution controller, and obtaining the segment of video data associated with the video identifying information from said cache memory to transfer the obtained segment of video data to a requester at a transfer rate defined on the segment of video data in a vicinity of a source of the video data, said method comprising:

receiving by said first relay controller the video data, and supplying the received video data to said cooperation controller;

obtaining by said cooperation controller the video identifying information of the segment of video data;

determining by said cooperation controller whether or not said information memory contains the video identifying information matching the obtained video identifying information, and outputting the control signal representative of a result of determination;

storing by said first relay controller in said information memory, when said cooperation controller determines that said information memory does not contain the video identifying information matching the obtained video identifying information, the video identifying information of the segment of video data in association with reception time and a size of video data;

transmitting by said first relay controller, when said information memory contains the video identifying information matching the obtained video identifying information, the cache distribution request containing at least the video identifying information;

receiving the cache distribution request by said second relay controller, and supplying the received cache distribution request to said distribution controller;

obtaining by said distribution controller the video identifying information contained in the cache distribution request and controlling relay distribution on the basis of the obtained video identifying information;

reading out by said distribution controller from said cache memory the cached segment of video data associated with the obtained video identifying information; and transferring by said second relay controller the read-out segment of video data to the requester at a transfer rate defined on the segment of video data in the vicinity of the source of the video data.

9. The apparatus in accordance with claim 1, wherein said distribution controller derives transmission information of the segment of video data in the vicinity of the source included in the cache distribution request, and said relay controller transfers the segment of video data at a transfer rate based on the transmission information derived by said distribution controller.

\* \* \* \* \*